(12) United States Patent
King

(10) Patent No.: US 6,668,957 B2
(45) Date of Patent: Dec. 30, 2003

(54) VEHICLE BATTERY SUPPORT PLATFORM ASSEMBLY AND CROSS TIE ALIGNMENT TOOL

(75) Inventor: Arden Lee King, Churubusco, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/116,302

(22) Filed: Apr. 4, 2002

(65) Prior Publication Data

US 2003/0188903 A1 Oct. 9, 2003

(51) Int. Cl.[7] .............................................. B60R 16/04
(52) U.S. Cl. ...................... 180/68.5; 280/781; 280/800
(58) Field of Search ............................. 180/68.5, 65.1; 280/781, 800, 795, 797, 798, 799; 248/503, 647

(56) References Cited

U.S. PATENT DOCUMENTS

| | | | |
|---|---|---|---|
| 5,366,246 A | * 11/1994 | Chen et al. ................. 280/834 |
| 5,380,042 A | 1/1995 | Hively et al. |
| 5,639,571 A | * 6/1997 | Waters et al. .................. 429/71 |
| 5,647,450 A | * 7/1997 | Ogawa et al. ............... 180/220 |
| 5,673,940 A | 10/1997 | Gaisford et al. |
| 5,806,948 A | * 9/1998 | Rowan et al. ........... 312/293.3 |
| 6,085,854 A | * 7/2000 | Nishikawa .................. 180/68.5 |
| 6,189,635 B1 | 2/2001 | Schuler et al. |
| 6,220,380 B1 | 4/2001 | Mita et al. |
| 6,220,784 B1 | * 4/2001 | Bricker ....................... 405/118 |
| 6,547,020 B2 | * 4/2003 | Maus et al. ................ 180/68.5 |

* cited by examiner

Primary Examiner—Brian L. Johnson
Assistant Examiner—Brian L Swenson
(74) Attorney, Agent, or Firm—Jeffrey P. Calfa; Dennis Kelly Sullivan; Susan L. Lukasik

(57) ABSTRACT

A battery and accessory support for use on a vehicle is disclosed for use particularly on a hybrid diesel/electric truck. Such a vehicle has a frame comprising a pair of longitudinally extending frame rails. The support includes a plurality of cross support members, each cross support member comprising an open channel rail, with the cross support members positioned under the frame rails oriented in parallel with respect to one another and perpendicular to the frame rails. For each cross support member there is a pair of vertical braces extending upwardly from the cross support member. Each pair of vertical braces is mutually spaced on its respective cross support member to bracket snugly the pair of longitudinally extending frame rails, and each vertical brace being attached to one of the frame rails to support the battery and accessory support. Alignment members are positioned across the ends of cross support members to support the parallel orientation of the cross support members. The alignment members each have a plurality of spaced protrusions for engaging the cross support members.

7 Claims, 7 Drawing Sheets

US 6,668,957 B2

VEHICLE BATTERY SUPPORT PLATFORM ASSEMBLY AND CROSS TIE ALIGNMENT TOOL

BACKGROUND OF THE INVENTION

1. Field of the Invention

The present invention relates generally to motor vehicle assembly and more particularly to easing assembly of a support platform for a vehicle battery plant located outside the longitudinal frame rails of a vehicle's chassis.

2. Description of the Prior Art

Frames for vehicles such as delivery trucks generally include a pair of longitudinally extending side rails or frame rails. Such rails are constructed of substantial C-shaped steel beams and are oriented so that the C is closed toward the exterior of the vehicle and open to each other. The frame rails are rigidly positioned in parallel to one another by a series of cross members and provide a narrow protected space between the rails. Many components have traditionally been hung from the rails toward the outside edge of the vehicle, including fuel tanks.

Placement of the bulky and heavy battery plants required for a hybrid diesel/electric truck on the truck should be done in a way which does not raise, and preferably lowers, the center of gravity of the vehicle. Access to the batteries for maintenance and replacement should be limited to as little an extent as reasonably feasible. The increased complexity of such vehicles, with provision for fuel tanks, a diesel engine, conventional drive train, electrical generation and drive elements, control units, and power conversion features places space on the vehicle at a premium. As a result, battery plants have been located low on the chassis, and supported outside of the chassis frame rails. It is an object of the invention to ease the assembly and improve the alignment of such a battery support platform.

SUMMARY OF THE INVENTION

The present invention provides an intermediate product through which assembly of a battery and accessory support for use on a vehicle, particularly a hybrid diesel/electric truck, is eased. Such a truck has a frame comprising a pair of longitudinally extending frame rails. The support includes a plurality of cross support members, each cross support member comprising an open channel rail. The cross support members are positioned under the frame rails and are oriented in parallel with respect to one another and perpendicular to the frame rails. For each cross support member there is a pair of vertical braces extending upwardly from the cross support member. Each pair of vertical braces is mutually spaced on its respective cross support member to bracket snugly the pair of longitudinally extending frame rails, and each vertical brace is attached to one of the frame rails to support the battery and accessory support. A cross tie alignment tool is positioned across the ends of cross support members to force the parallel orientation of the cross support members during assembly. The alignment members each have a plurality of spaced protrusions for engaging the cross support members.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
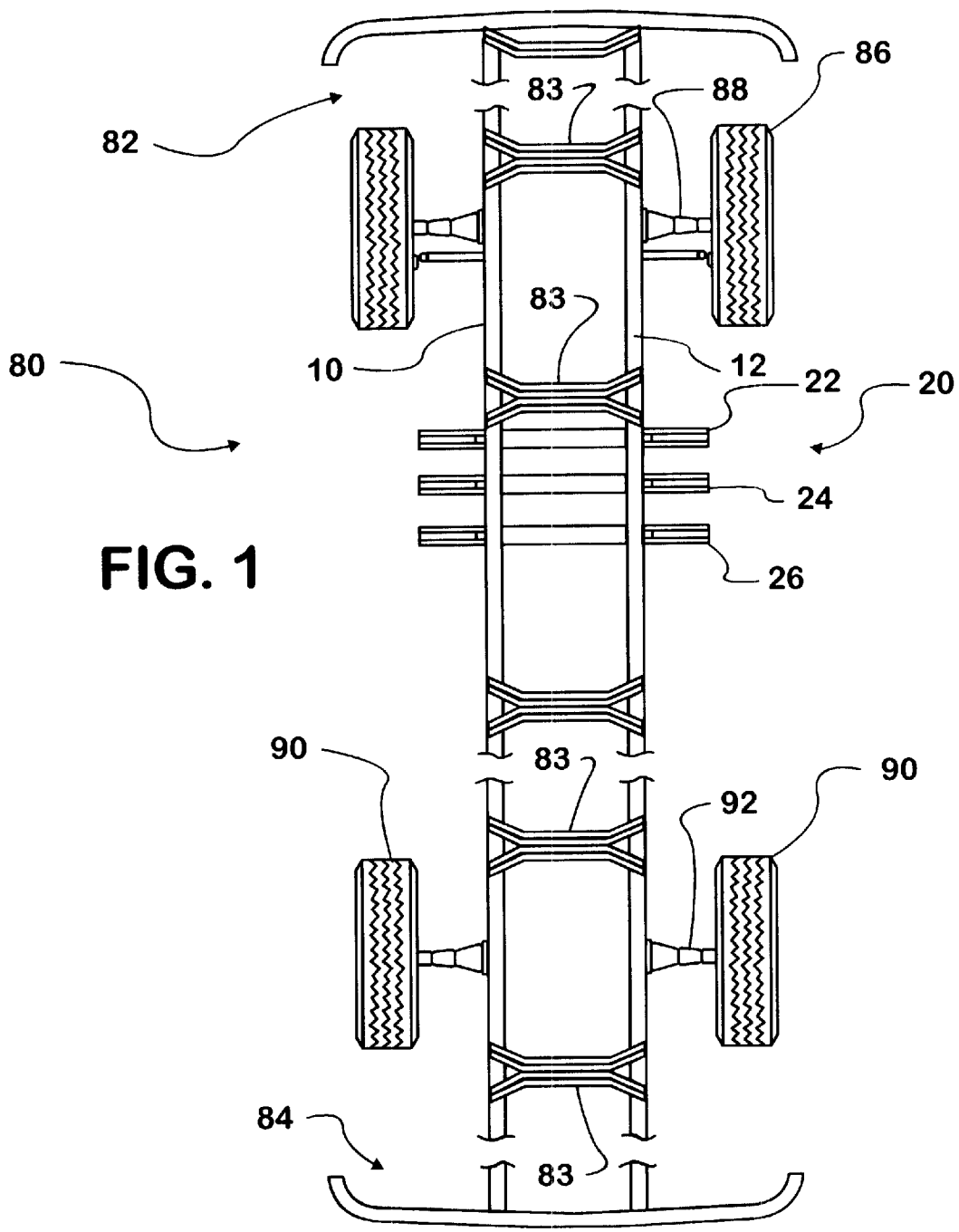
FIG. 1 is a plan view of a vehicle chassis.

Referring now to FIG. 1, a plan view of a vehicle chassis 80 illustrates the position of a battery and accessory support platform 20 on the chassis. Chassis 80 comprises a pair of parallel, longitudinally extending frame rails 10 and 12 which extend from the front end 82 of the vehicle to the rear end 84. Frame rails 10 and 12 are connected to one another by a plurality of cross members 83. Front steerable wheels 86 are carried on a front axle 88 while rear drive wheels 90 are carried on a rear axle 92. The vehicle supported on chassis 80 is preferably an electric or diesel/electric hybrid vehicle and requires a substantial battery plant for electric operation. A battery and accessory support platform 20 hangs from side rails 10 and 12 between the front axle 88 and rear axle 92.

Battery support platform 20 comprises three support rails 22, 24 and 26, which are mounted below the frame rails 10 and 12, parallel to one another and perpendicular to the frame rails. Support rails 22, 24 and 26 are substantially longer than the spacing between frame rails 10 and 12, with the result that the support rails extend out from the frame rails toward the sides of the vehicle and can be used to provide a substantial area of support between the frame rails and the outside edges of the vehicle. Battery boxes are advantageously positioned on platform 20 outside of the gap between the frame rails 10 and 12 and are located at the level of the frame rails, keeping the vehicle's center of gravity low.

Figure 2:
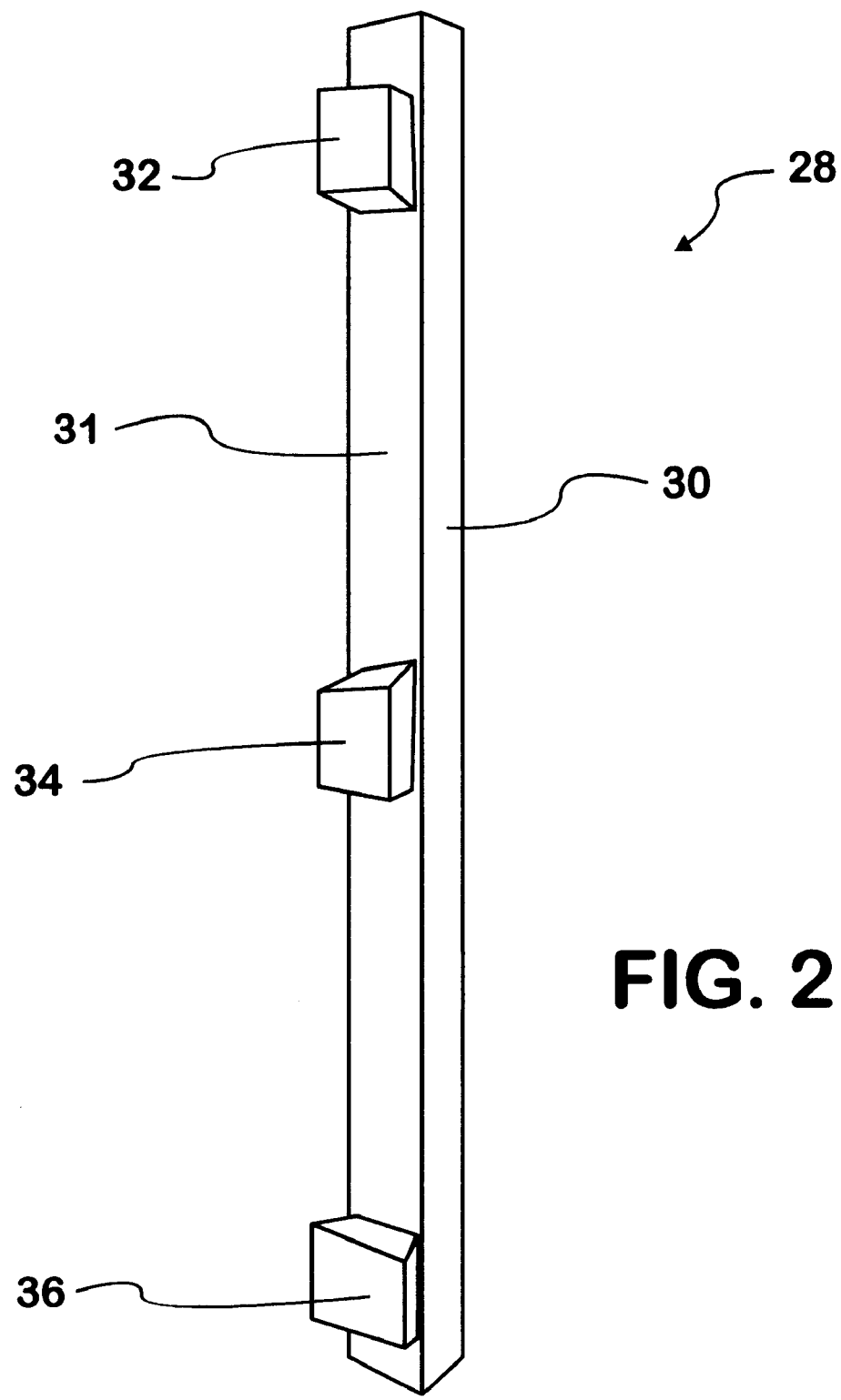
FIG. 2 is a perspective view of a cross tie alignment tool in accordance with one embodiment of the invention.

Referring now to FIG. 2, an alignment tool 28 used in constructing platform 20 is illustrated. Alignment tool 28 comprises a single elongated member 30, preferably formed from a piece of wood, although other materials may be used. Extending from one major surface 31 of the alignment tool are three alignment blocks 32, 34 and 36, which may be glued, bolted or nailed to the elongated member 30. Alternatively, a block of material may be shaped by molding or cutting to the "E" pattern of tool 28. Alignment blocks 32, 34 and 36 are spaced to the preferred spacing between support rails 22, 24 and 26, and are sized and shaped to fit snugly into the open channels of the rails, as illustrated below.

Figure 3:
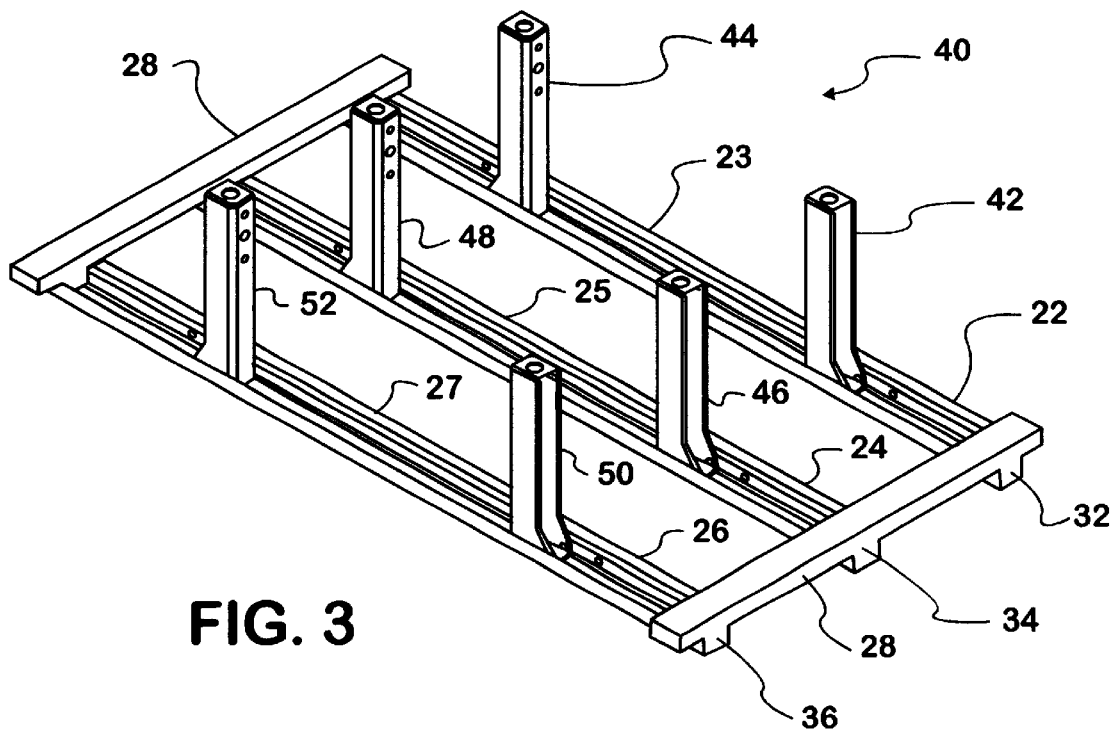
FIG. 3 is a perspective view of a battery and accessory support being constructed in accordance with one embodiment of the invention.
Figure 4:
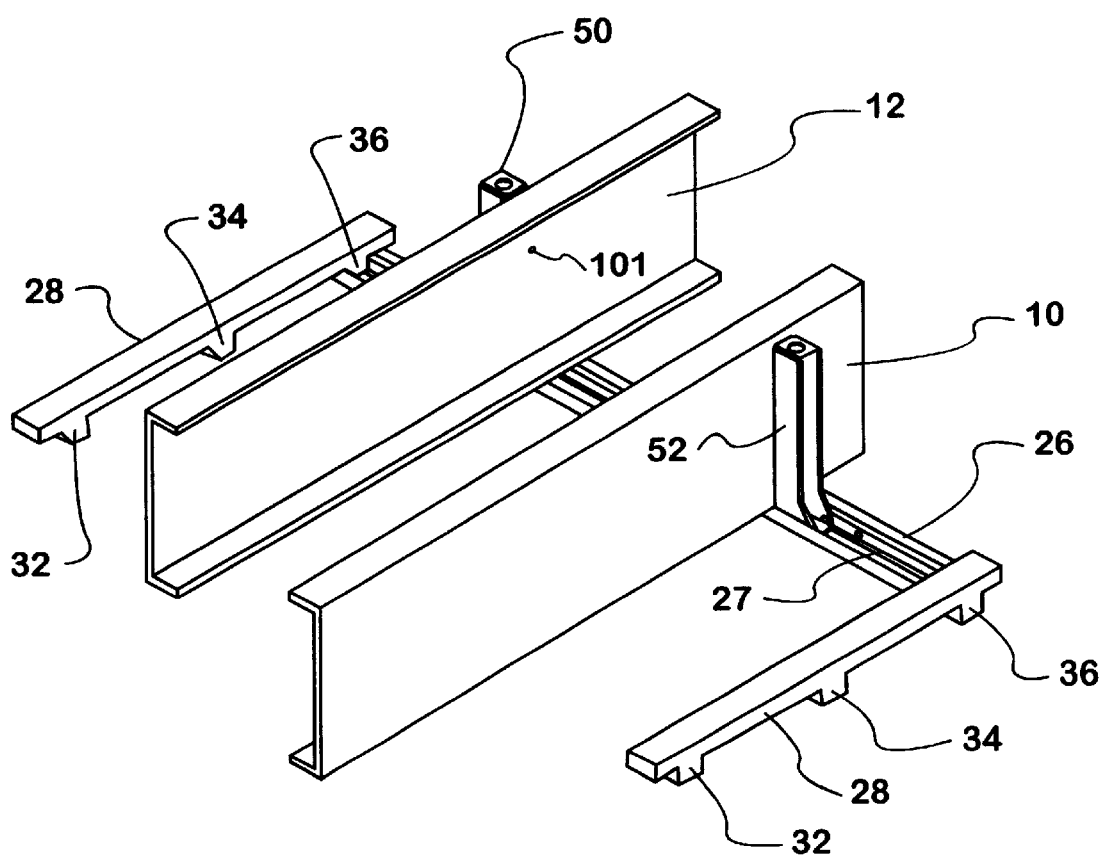
FIGS. 4–6 illustrate use of the cross member alignment tool of the invention in constructing a battery support platform.

In FIG. 3, one possible intermediate step in constructing battery and accessory support platform 20, is illustrated. The constituent components of the platform and two cross tie alignment tools 28 have been assembled. The constituent components of a platform 20 include three support rails 22, 24 and 26. For each support rail there are two vertical members or hangers by which the rail is attached to the frame rails 10 and 12 of the vehicle chassis 80. Accordingly, two vertical members 42 and 44 are associated with support rail 22, vertical members 46 and 48 are associated support rail 24 and vertical members 50 and 52 are associated with support rail 26. The vertical members have a horizontal cross-sectional "C" shape. The support rails 22, 24 and 26 are formed as C-shaped channels, and are positioned with the channels open upwardly, as illustrated. Vertical members are set into the channels and extend upwardly from the rails. Appropriate fasteners, or spot welding, may be used to attach the vertical members to their respective support rails.

Each pair of vertical members for a support rail are spaced to fit around the outside faces of a vehicle's frame rails, and are attached to the frame rails by nut and bolt fasteners. Spacing, and a parallel relationship between support rails 22, 24 and 26, is maintained during assembly by cross tie alignment tools 28 which have been introduced, major surface 31 face down, into engagement with the open channels 23, 25 and 27 prior to the assembly being installed on a vehicle chassis. Alignment blocks 32, 34 and 36 fit snugly into channels 23, 25 and 27, respectively, with limited play, to prevent the rails from becoming canted, parallelogram fashion, as a unit.

FIGS. 4–7 illustrate an alternative method of using alignment tool 28 in constructing a battery and support platform on a vehicle chassis. The views are taken at the reverse angle to that of FIG. 3. A first support rail, which can be any of the support rails, but here is the rear most support rail 26, is positioned squarely on the side frame rails 10 and 12, with the support rail placed underneath the frame rails and with vertical members 52 and 50 bracketing the frame rails. Vertical members 50 and 52 are attached by fasteners 101 to the frame rails so that, in effect, support rail 26 hangs from the vehicle chassis. Alignment tools 28 are then fitted at one end each to each end of support rail 26 with alignment blocks 36 being forced into channel 27. Free alignment blocks 32 and 34 will provide for the correct positioning of the remaining support rails without the need for careful measurement or the use of more than one worker to hold the rail while a second positions it.

Figure 5:
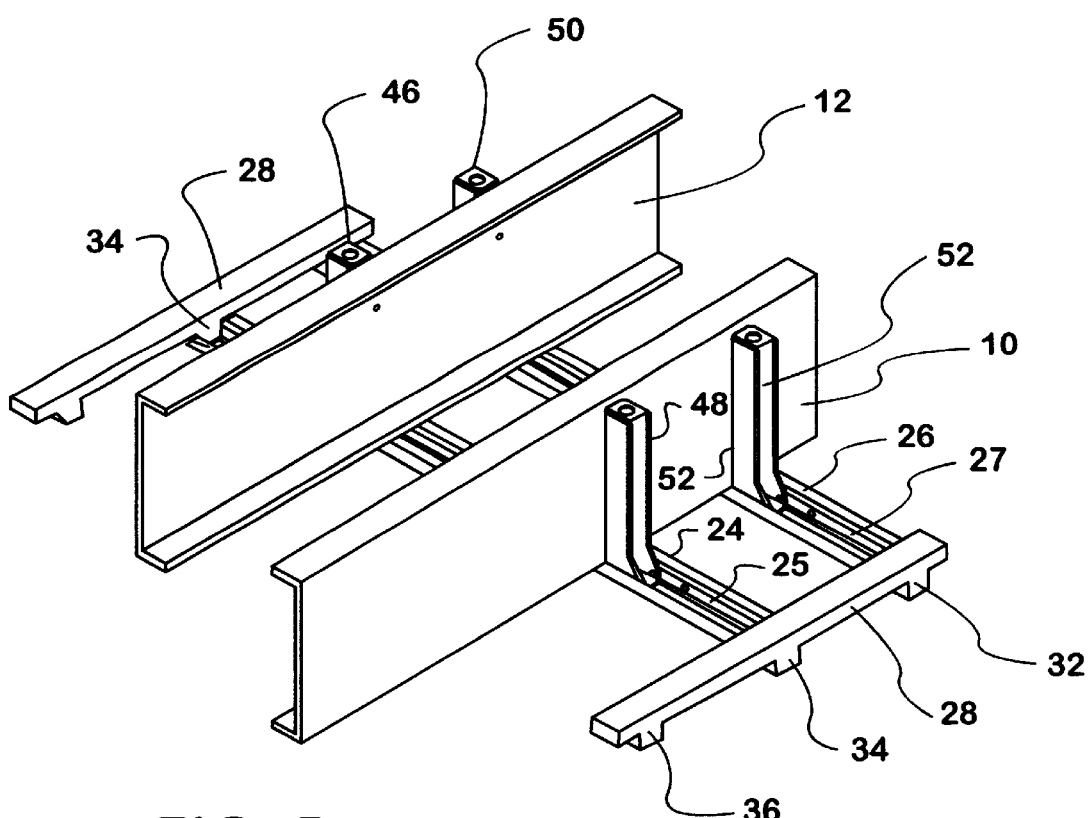
Figure 6:
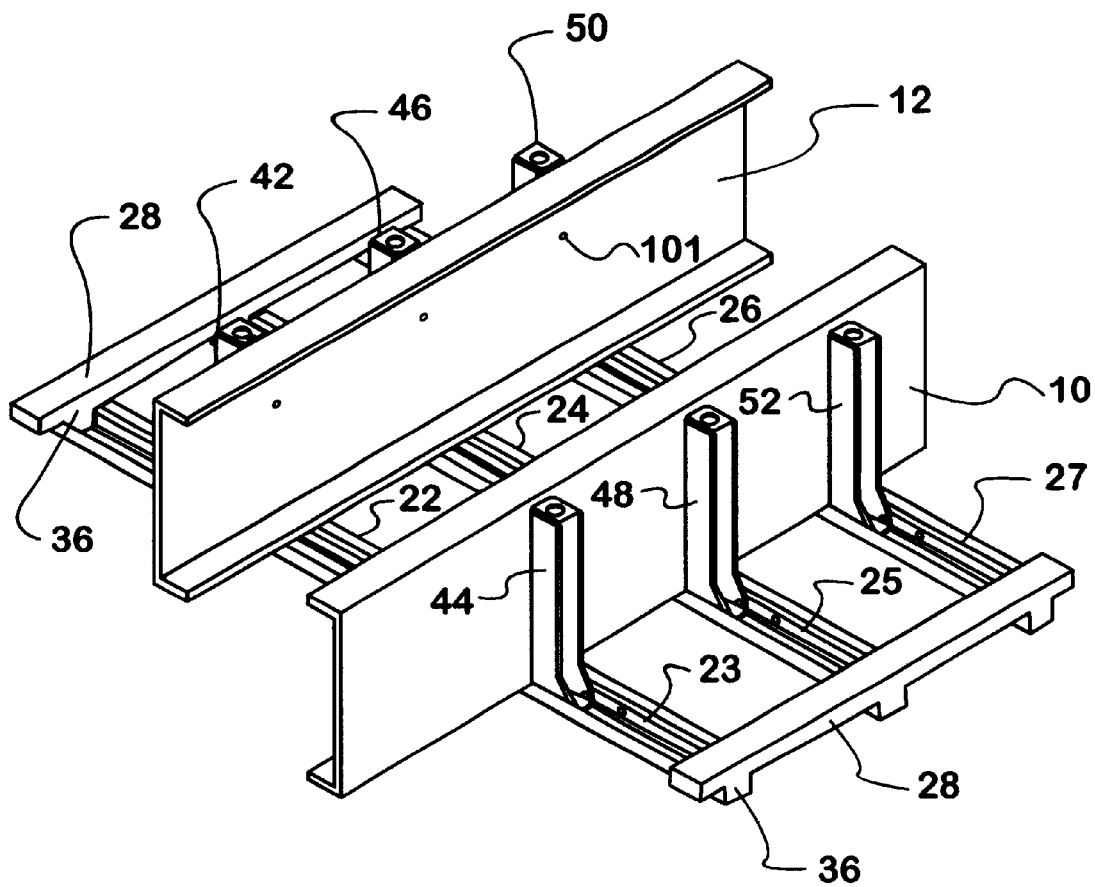

In FIG. 5 the installation of a second support rail 24 on a vehicle's chassis is illustrated. Here it is simply necessary to bring support rail 24 up into engagement with alignment blocks 34 and the support rail will automatically be positioned at the correct distance from, and parallel to support rail 26. Finally in FIG. 6, the last of the three parallel support rails forming a battery support platform, support rail 22, is positioned by bringing it up into engagement along its channel 23 with alignment blocks 36. With the support rails correctly positioned by alignment tools 28, attaching the vertical members to the frame side rails by nuts and bolts is readily completed.

Figure 7:
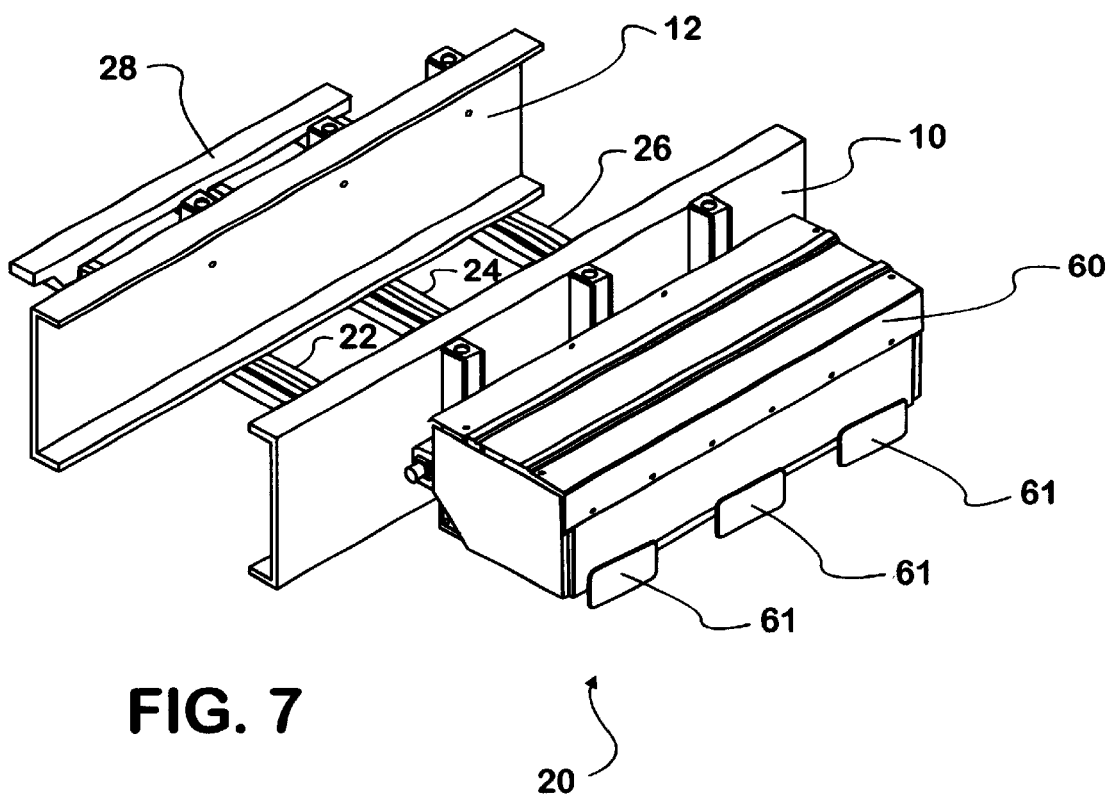
FIG. 7 is a perspective view of a section of a vehicle chassis on which the battery and accessory support has been installed illustrating use of the support with a battery box.

FIG. 7 illustrates a nearly completed battery and accessory support platform 20, with a battery box 60 positioned on one side of the platform after removal of the alignment tool 28. Retaining flanges 61 are illustrated positioned into the ends of the support rails 22, 24 and 26 as an aid to retaining battery box 60 in position between a vehicle frame rail 10 and the outside edge of the vehicle. A similar battery box can also be installed on the opposite side of platform 20, toward an outside edge of a vehicle away from frame rail 12.

The present invention provides a reliable way to produce uniform battery support platforms for vehicles which are constructed of support rails depending from the vehicle chassis. Such platforms can be readily expanded to handle increased numbers of battery boxes required for all electric rather than hybrid vehicles.

While the invention is shown in only one of its forms, it is not thus limited but is susceptible to various changes and modifications without departing from the spirit and scope of the invention.

What is claimed is:

1. A battery and accessory support for use on a vehicle having a pair of longitudinally extending frame rails, comprising at an intermediate stage of assembly:
   a plurality of cross support members, each cross support member comprising an open channel rail, the cross support members being positioned under the frame rails with the open channel rails upwardly open, the cross support members being oriented in parallel with respect to one another and perpendicular to the frame rails;
   a pair of vertical braces extending upwardly from each cross support member, each pair of vertical braces being mutually spaced on their respective cross support member to bracket snugly the pair of longitudinally extending frame rails, and each vertical brace being attached to one of the frame rails to support the battery and accessory support; and
   a pair of alignment members, each alignment member comprising an elongated segment with a plurality of spaced protrusions on one side thereof conforming closely to the interior shape and size of the open channel rails for engaging snugly the open channel rails, the alignment members being laid across the plurality of open channel rails parallel to the frame rails, fixing the orientation of the cross support members.

2. A battery and accessory support as claimed in claim 1, wherein the alignment members are positioned along opposite outside ends of the cross support members.

3. A truck comprising at an intermediate stage of assembly;
   a chassis having a pair of parallel, longitudinally extending frame rails, the frame rails being C-shaped;
   a plurality of cross support members positioned under the frame rails parallel to the plane of the frame rails, the cross support members being oriented parallel to one another and perpendicular to the frame rails, each cross support member having an upwardly opened channel running from end to end of the cross support member;
   a pair of vertical braces extending upwardly from each cross support member, each pair of vertical braces being mutually spaced on their respective cross support member to bracket snugly the pair of longitudinally extending frame rails, and each vertical brace being attached to one of the frame rails; and
   at least a first alignment member comprising an elongated member and a plurality of protuberances extending from one side of the elongated member shaped and sized to fit snugly into the upwardly opened channels, said at least first alignment member being laid parallel to the frame rails across the plurality of cross support members.

4. A truck as claimed in claim 3, further comprising a pair of alignment members each being laid across the plurality of cross support members along opposite ends of the cross support members.

5. A method of assembling a vehicle comprising the steps of:
   providing a frame comprising two longitudinally extended, parallel frame rails;

providing components for a battery and accessory support platform comprising hangers for attachment to the frame rails and cross support rails depending from the hangers, the cross support rails having an open channel along one side thereof;

suspending a first cross support rail from and perpendicular to the frame rails with the open channel upwardly oriented;

providing a cross tie alignment tool having an elongated member as a main body and a plurality of protuberances extending from one side of the elongated member; and aligning the remaining cross support rails on the first cross support rail as each is suspended from the frame rails by placing the cross tie alignment tool in an orientation with the protuberances down and with one protuberance snugly fitted into the open channel of the first cross support frame rail with a cross tie alignment tool.

6. A method as set forth in claim 5, further comprising the step of:

removing the cross tie alignment tool after suspending the final cross support member.

7. A method as set forth in claim 6, further comprising:

positioning a battery box on the cross support members between one of the frame rails and the side of the vehicle.

* * * * *